Figure 1:
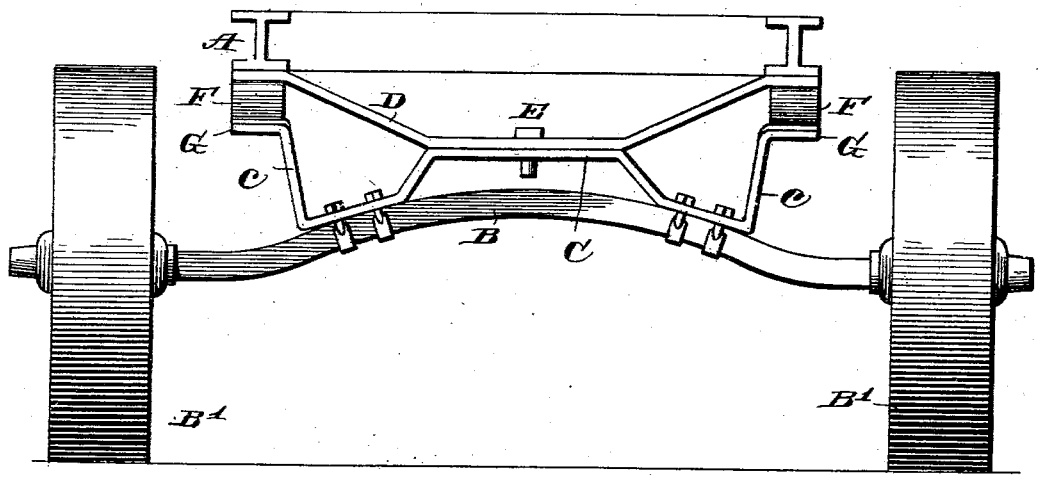

No. 739,777. PATENTED SEPT. 22, 1903.
M. G. BUNNELL.
RUNNING GEAR.
APPLICATION FILED DEC. 23, 1901.

NO MODEL.

Witnesses:
J. H. Glendenning
G. A. Pauberschmidt

Inventor:
Morton G. Bunnell
by Arthur F. Durand
Attorney.

No. 739,777.                                          Patented September 22, 1903.

UNITED STATES PATENT OFFICE.

MORTON G. BUNNELL, OF CHICAGO, ILLINOIS, ASSIGNOR, BY MESNE ASSIGNMENTS, TO WESTERN WHEELED SCRAPER COMPANY, OF AURORA, ILLINOIS, A CORPORATION OF ILLINOIS.

RUNNING-GEAR.

SPECIFICATION forming part of Letters Patent No. 739,777, dated September 22, 1903.

Original application filed April 5, 1901, Serial No. 54,460. Divided and this application filed December 23, 1901. Serial No. 86,912. (No model.)

*To all whom it may concern:*

Be it known that I, MORTON G. BUNNELL, a citizen of the United States, residing at Chicago, in the county of Cook and State of Illinois, have invented a certain new and useful Improvement in Running-Gear, of which the following is a specification.

My invention relates to the forward running-gear of vehicles.

Objects of my invention are to provide a construction which will relieve the running-gear and also the frame or body structure of the vehicle from injurious strains, to provide a construction which will prevent the frame or body of the vehicle from tilting or rolling to one side, to provide a construction which will permit the forward axle to tilt or rock freely while the vehicle is being turned around, and to provide certain details and features of improvement tending to increase the general efficiency of running-gear.

To the foregoing and other useful ends the running-gear can be provided with lateral bearings which prevent the frame or body of the vehicle from rocking or rolling to one side when the vehicle is running straight ahead or describing a large circle. These bearings can be arranged in such manner as to free the axle and permit the latter to tilt or rock freely while the vehicle is being turned around. Preferably each bearing comprises a couple of members or bearing-pieces which only engage each other at a time when the axle is at right angles or substantially at right angles to the body of the vehicle. Furthermore, one member of each bearing is preferably in the form of a rounded projection on the frame or body, while the other member of such bearing is preferably in the form of an upwardly-projecting arm having its lower portion secured to the axle and its upper end rounded or otherwise adapted to slide beneath the said rounded projection on the frame or body. In this way the said bearings brace the frame or body of the vehicle against side tilt—that is to say, they prevent the body of the vehicle from rocking or rolling to one side. As stated, however, these lateral bearings do not prevent the axle from tilting or rocking while the vehicle is being turned around. This permits the running-gear to adjust itself with reference to unevenness of the ground and prevents the weight of the forward portion of the vehicle from being thrown entirely upon one of the forward vehicle-wheels.

The nature and advantages of my invention will, however, hereinafter more fully appear.

Figure 2:
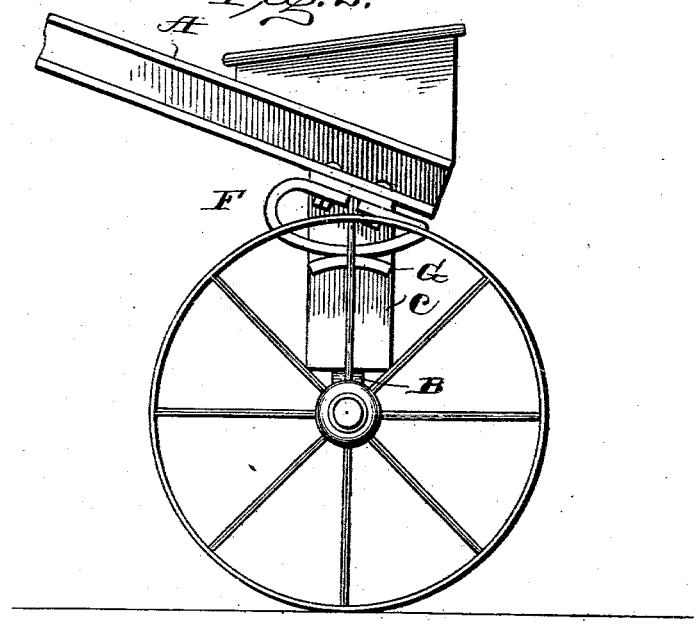

In the accompanying drawings, Figure 1 is a front elevation of a vehicle provided with forward running-gear constructed in accordance with my invention. Fig. 2 is a side elevation of the forward running-gear and the forward portion of the vehicle shown in Fig 1.

It will be readily understood that the frame or body A of the vehicle can be of any suitable or desired construction.

My improved forward running-gear is applicable to various kinds of vehicles.

The axle B can be of any suitable form or construction. The wheels B' are mounted at the opposite ends of said axle. To the upper side of said axle is secured a bar or strip of metal C, bent or shaped to provide two upwardly-projecting arms c. It will also be observed that the central or middle portion of this bar is substantially in the form of an arch. The forward portion of the vehicle frame or body is provided with a cross-bar or transversely-arranged portion D. This cross-bar is preferably depressed at its center or middle portion, so as to enable it to rest upon the middle or arching central portion of the axle-bar C. In this way the central portions of the bars C and D constitute a fifth-wheel device, the king-bolt E permitting the axle and wheels to turn or swing to one side in the usual manner. The frame or body can be provided with rounded portions F, adapted and arranged in position to engage the upper ends G of the arms c. When the machine is running straight ahead, these rounded portions F bear upon the upper ends G of said arms, as shown in the drawings. It will be seen, however, that these rounded end portions G become disengaged as soon as the axle is turned to one side for the purpose of turning the vehicle around. In this way these portions F and G constitute lateral bearings for bracing the frame or body against lateral rocking or rolling while the machine is running straight ahead or describing a large circle; but, as stated, these lateral bearings free the axle as soon as the latter is turned or swung sharply to one side for the purpose of turning the vehicle around. In this way the axle is free to tilt or rock when turned to one side and while the vehicle is being turned around. While the vehicle is running straight ahead or describing a large circle the bearing members F and G render the frame or body practically rigid with the axle. When the axle is swung about its pivotal point, however, the rounded end portions G slide out from under the rounded member F and the axle is, as stated, then free to tilt or rock, so as to permit either wheel to settle into a depression or to rise in rolling over an obstruction. In this way the running-gear is adapted to automatically adjust itself with reference to unevenness of the ground. Such automatic adjustment insures against injurious strains, as it precludes all possibility of one of the forward wheels being forced to sustain the entire weight of the forward portion of the vehicle.

What I claim as my invention is—

1. A vehicle having forward running-gear provided with laterally-arranged bearings each composed of rounded members arranged respectively upon the frame and axle, the rounded members on the frame engaging the rounded members on the axle when the axle is at right angles, or substantially at right angles, to the frame or body of the vehicle, and the rounded members on the frame or body disengaging the members on the axle when the latter is cramped or turned to one side, as in turning the vehicle around, and the bearing members on the axle being adapted and arranged to slide readily beneath the rounded bearing members on the frame, substantially as described.

2. A vehicle having forward running-gear comprising an axle, upwardly-projecting arms on said axle, said arms having their upper ends provided with rounded bearing portions, the rounded bearing portions or members secured to the under side of the vehicle frame or body, the said rounded members on the frame being adapted and arranged to engage the rounded upper ends of said arms on the axle, substantially as described.

3. In a vehicle, the combination of the forward axle, a pivotal or fifth-wheel connection between said axle and the frame or body of the vehicle, rounded bearing members secured to said frame or body, upwardly-projecting arms secured to said axle, the upper ends of said arms being provided with rounded bearing portions adapted to engage the rounded bearing portions on the frame or body, the bearing portions thus adapted and arranged to engage each other constituting laterally-arranged bearings for bracing the frame or body against side tilt while the vehicle is running straight ahead or describing a large circle, the axle being disengaged and free to tilt or rock while the machine is being turned around, substantially as described.

4. In a vehicle, the combination of the forward axle and wheels, a bent bar secured to the upper side of said axle, said bar having its ends upturned and provided with bearing portions, the central portion of said bar being arched, or substantially arched, to provide a seat for the forward portion of the frame or body structure, and the said frame or body structure being provided with rounded bearing portions or members adapted and arranged to engage the upturned end portions of the said bar on said axle, the laterally-arranged bearings thus provided bracing the frame or body against side tilt while the machine is running straight ahead or describing a large circle, and the formation of said bearings permitting the axle to disengage itself and tilt or rock freely while the vehicle is being turned around, substantially as described.

5. A forward running-gear for vehicles, comprising the forward axle and vehicle-wheels, a bent bar or bolster secured to the upper side of said axle, the end portions of said bar being upturned and formed with bearing portions, the middle portion of said bar or bolster being elevated or raised to provide a seat, a bar or cross-piece secured to the frame or body of the vehicle and arranged to seat upon the said elevated or raised portion of the said bar or bolster on the axle, rounded bearing portions or members secured to the under side of said vehicle frame or body, said rounded bearing portions being adapted and arranged to engage the bearing portions on the upturned ends of said bar or bolster on the axle, and the opposing bearing portions or members thus provided constituting laterally-arranged bearings for preventing rocking or rolling of the vehicle frame or body while the vehicle is running straight ahead or describing a large circle, and the formation of the said bearings permitting the axle to disengage itself and tilt or rock freely while the machine is being turned around, substantially as described.

6. A forward running-gear for vehicles, comprising a forward axle and vehicle-wheels, the bent bar or bolster C provided with the bearing portions G, the vehicle frame or body provided with the cross piece or bar D, a king-bolt connecting the bar or bolster C with the said bar D, and the rounded bearing portions or members F adapted and arranged to engage the said bearing portions D, substantially as and for the purpose set forth.

7. The combination of a vehicle-body, laterally-arranged bearing portions carried by said frame, a pivoted front axle, and lateral bearings carried by said axle and adapted to engage said first-mentioned bearings, the pivotal connection of the said axle being adapted to permit the lateral bearings to tilt freely when the axle is cramped or skewed, and said latter bearings being adapted to readily reëngage each other to prevent tilting movement of the axle when the latter is returned to its position at right angles with the length of the vehicle.

MORTON G. BUNNELL.

Witnesses:
ARTHUR F. DURAND,
MAX N. ZABEL.